United States Patent
Taylor et al.

(10) Patent No.: US 10,732,710 B2
(45) Date of Patent: Aug. 4, 2020

(54) PRIVACY CHAT TRIGGER USING MUTUAL EYE CONTACT

(71) Applicant: Sony Interactive Entertainment Inc., Tokyo (JP)

(72) Inventors: Michael Taylor, San Mateo, CA (US); Glenn Black, San Mateo, CA (US); Javier Fernandez Rico, San Mateo, CA (US)

(73) Assignee: Sony Interactive Entertainment Inc., Tokyo (JP)

( * ) Notice: Subject to any disclaimer, the term of this patent is extended or adjusted under 35 U.S.C. 154(b) by 0 days.

(21) Appl. No.: 16/018,966

(22) Filed: Jun. 26, 2018

(65) Prior Publication Data
US 2019/0391637 A1    Dec. 26, 2019

(51) Int. Cl.
*G06F 3/01*     (2006.01)
*G06T 19/00*    (2011.01)
*A63F 13/87*    (2014.01)

(52) U.S. Cl.
CPC .............. *G06F 3/013* (2013.01); *A63F 13/87* (2014.09); *G06T 19/006* (2013.01)

(58) Field of Classification Search
CPC ........ G06F 3/012; G06F 3/013; G06F 3/0304; G06F 3/011
See application file for complete search history.

(56) References Cited

U.S. PATENT DOCUMENTS

| | | | |
|---|---|---|---|
| 2013/0271560 A1* | 10/2013 | Diao | H04N 7/15 348/14.08 |
| 2015/0153922 A1* | 6/2015 | Ballard | G06F 3/0487 345/156 |
| 2016/0093108 A1* | 3/2016 | Mao | A63F 13/42 345/633 |
| 2016/0154460 A1* | 6/2016 | von Liechtenstein | G02B 27/017 345/156 |
| 2016/0246365 A1* | 8/2016 | Bedell, Jr. | G06K 9/0061 |
| 2017/0041374 A1* | 2/2017 | Rakshit | H04L 67/06 |
| 2017/0359456 A1* | 12/2017 | Shrubsole | G06F 1/163 |
| 2018/0005429 A1* | 1/2018 | Osman | A63F 13/5255 |
| 2018/0039076 A1* | 2/2018 | Lection | G02B 27/0172 |
| 2018/0107839 A1* | 4/2018 | Clement | G06F 3/011 |
| 2019/0087000 A1* | 3/2019 | Ricknas | G02B 27/017 |

OTHER PUBLICATIONS

International Search Report and Written Opinion dated Sep. 18, 2019 from the counterpart PCT application PCT/US19/37040.

* cited by examiner

*Primary Examiner* — Md Saiful A Siddiqui
(74) *Attorney, Agent, or Firm* — John L. Rogitz

(57) ABSTRACT

Player-to-player eye contact is used to establish a private chat channel in an augmented reality (AR) or virtual reality (VR) setting. Since maintaining eye contact requires agreement from both parties, it allows both players an equal amount of control when performing the mutual action. Eye tracking may be used for determining whether mutual eye contact has been established. In the case of AR, "inside out" eye tracking can be used, whereas in a VR setting only inside eye tracking need be used. Techniques are described to confirm and establish a channel once eye contact has been held.

19 Claims, 5 Drawing Sheets

PRIVACY CHAT TRIGGER USING MUTUAL EYE CONTACT

FIELD

The present application relates to technically inventive, non-routine solutions that are necessarily rooted in computer technology and that produce concrete technical improvements.

BACKGROUND

Multiple players can interact in augmented reality (AR) and virtual reality (VR) computer games, sometimes as team members.

SUMMARY

As understood herein, it may be desirable to surreptitiously establish a communication channel between two users in an AR or VR setting that is intuitive and easy to employ. In overview, eye tracking may be used on two or more players in an AR or VR game or other AR/VR setting to determine whether two players have made eye contact with each other, and if so, a private chat channel is established. Because maintaining eye contact requires agreement from both parties, it allows both players an equal amount of control when performing the mutual action. In the case of AR, "inside out" eye tracking can be used, whereas in a VR setting only inside eye tracking need be implemented. Techniques are described for confirming and establishing a channel once eye contact has been held.

Accordingly, as envisioned herein, a storage device includes at least one computer medium that is not a transitory signal and that in turn includes instructions executable by at least one processor to identify that a first user in a virtual reality (VR) or augmented reality (AR) setting has made mutual eye contact with a second user in the VR or AR setting, and responsive to identifying that the first and second users have made mutual eye contact, establish a communication channel between the first and second users.

In some embodiments, the communication channel includes a private chat channel. In non-limiting examples, the instructions are executable to maintain the communication channel only as long as the first and second users are identified as having mutual eye contact with each other. In non-limiting implementations the instructions are executable to establish the communication channel responsive to a determination that the first and second users are identified as having mutual eye contact with each other for at least a non-zero time period.

In example embodiments, if desired the instructions may be executable to terminate the communication channel responsive to a verbal cue, and/or responsive to a signal imparted by one or more eyes of at least one of the users, e.g., winking or blinking.

In some implementations, the instructions can be executable to allow a third user to access the communication channel responsive to identifying that the first and second users are both looking at the third user. In other examples, a third user may be allowed access to the communication channel responsive to identifying that at least one of the first user or second user is looking at the third user.

In examples, the setting is an AR setting, and identifying that the first user has made mutual eye contact with the second user includes determining that the first user has looked toward a physical location of the second user. In the AR setting, the AR headset is not limited to just external eye tracking. The AR headset can have eye tracking that also can be used by an AR application. For example, if the AR headset determines that two people are in the same space, then it can share (using peer-to-peer or via a server) the eye position of all people in the space such that other users share the information from the AR headset.

In other examples, the setting is a VR setting, and identifying that the first user has made mutual eye contact with the second user includes determining that the first user has looked toward a virtual location of the second user in VR space.

In another aspect, a method includes using player-to-player eye contact to identify whether a first player in an augmented reality (AR) or virtual reality (VR) game has established mutual eye contact with a second player. The method also includes, responsive to identifying that mutual eye contact has been established between the first and second players, establish a communication channel between the first and second players.

In another aspect, a system includes at least a first augmented reality (AR) or virtual reality (VR) headset wearable by a first user, at least a second AR or VR headset wearable by a second user, and respective cameras configured to produce image signals of the eyes of the first and second users. At least one processor is configured with instructions for executing eye tracking using the image signals to render an output and establishing at least a communication channel between the first and second users responsive to the output satisfying at least one criteria.

The details of the present application, both as to its structure and operation, can be best understood in reference to the accompanying drawings, in which like reference numerals refer to like parts, and in which:

DETAILED DESCRIPTION

Figure 1:
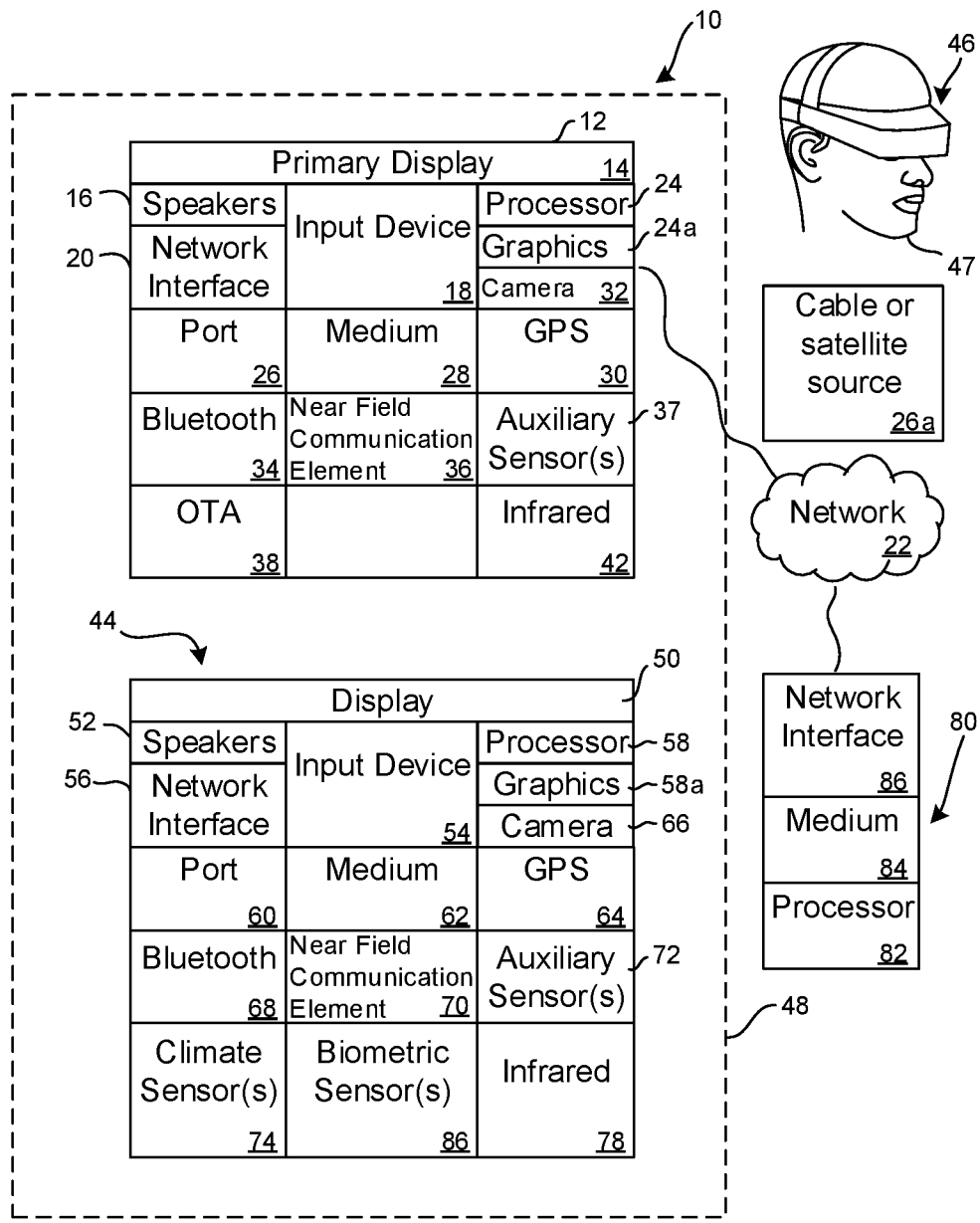
FIG. 1 is a block diagram of an example system consistent with present principles.

This disclosure relates generally to computer ecosystems including aspects of consumer electronics (CE) device networks such as but not limited to computer game networks. A system herein may include server and client components, connected over a network such that data may be exchanged between the client and server components. The client components may include one or more computing devices including game consoles such as Sony PlayStation® or a game console made by Microsoft or Nintendo or other manufacturer, virtual reality (VR) headsets, augmented reality (AR) headsets, portable televisions (e.g. smart TVs, Internet-enabled TVs), portable computers such as laptops and tablet computers, and other mobile devices including smart phones and additional examples discussed below. These client devices may operate with a variety of operating environments. For example, some of the client computers may employ, as examples, Linux operating systems, operating systems from Microsoft, or a Unix operating system, or operating systems produced by Apple Computer or Google.

These operating environments may be used to execute one or more browsing programs, such as a browser made by Microsoft or Google or Mozilla or other browser program that can access websites hosted by the Internet servers discussed below. Also, an operating environment according to present principles may be used to execute one or more computer game programs.

Servers and/or gateways may include one or more processors executing instructions that configure the servers to receive and transmit data over a network such as the Internet. Or, a client and server can be connected over a local intranet or a virtual private network. A server or controller may be instantiated by a game console such as a Sony PlayStation®, a personal computer, etc.

Information may be exchanged over a network between the clients and servers. To this end and for security, servers and/or clients can include firewalls, load balancers, temporary storages, and proxies, and other network infrastructure for reliability and security. One or more servers may form an apparatus that implement methods of providing a secure community such as an online social website to network members.

As used herein, instructions refer to computer-implemented steps for processing information in the system. Instructions can be implemented in software, firmware or hardware and include any type of programmed step undertaken by components of the system.

A processor may be any conventional general-purpose single- or multi-chip processor that can execute logic by means of various lines such as address lines, data lines, and control lines and registers and shift registers.

Software modules described by way of the flow charts and user interfaces herein can include various sub-routines, procedures, etc. Without limiting the disclosure, logic stated to be executed by a particular module can be redistributed to other software modules and/or combined together in a single module and/or made available in a shareable library.

Present principles described herein can be implemented as hardware, software, firmware, or combinations thereof; hence, illustrative components, blocks, modules, circuits, and steps are set forth in terms of their functionality.

Further to what has been alluded to above, logical blocks, modules, and circuits described below can be implemented or performed with a general-purpose processor, a digital signal processor (DSP), a field programmable gate array (FPGA) or other programmable logic device such as an application specific integrated circuit (ASIC), discrete gate or transistor logic, discrete hardware components, or any combination thereof designed to perform the functions described herein. A processor can be implemented by a controller or state machine or a combination of computing devices.

The functions and methods described below, when implemented in software, can be written in an appropriate language such as but not limited to Java, C # or C++, and can be stored on or transmitted through a computer-readable storage medium such as a random access memory (RAM), read-only memory (ROM), electrically erasable programmable read-only memory (EEPROM), compact disk read-only memory (CD-ROM) or other optical disk storage such as digital versatile disc (DVD), magnetic disk storage or other magnetic storage devices including removable thumb drives, etc. A connection may establish a computer-readable medium. Such connections can include, as examples, hard-wired cables including fiber optics and coaxial wires and digital subscriber line (DSL) and twisted pair wires. Such connections may include wireless communication connections including infrared and radio.

Components included in one embodiment can be used in other embodiments in any appropriate combination. For example, any of the various components described herein and/or depicted in the Figures may be combined, interchanged or excluded from other embodiments.

"A system having at least one of A, B, and C" (likewise "a system having at least one of A, B, or C" and "a system having at least one of A, B, C") includes systems that have A alone, B alone, C alone, A and B together, A and C together, B and C together, and/or A, B, and C together, etc.

Now specifically referring to FIG. 1, an example system 10 is shown, which may include one or more of the example devices mentioned above and described further below in accordance with present principles. The first of the example devices included in the system 10 is a consumer electronics (CE) device such as an audio video device (AVD) 12 such as but not limited to an Internet-enabled TV with a TV tuner (equivalently, set top box controlling a TV). However, the AVD 12 alternatively may be an appliance or household item, e.g. computerized Internet enabled refrigerator, washer, or dryer. The AVD 12 alternatively may also be a computerized Internet enabled ("smart") telephone, a tablet computer, a notebook computer, a wearable computerized device such as e.g. computerized Internet-enabled watch, a computerized Internet-enabled bracelet, other computerized Internet-enabled devices, a computerized Internet-enabled music player, computerized Internet-enabled head phones, a computerized Internet-enabled implantable device such as an implantable skin device, etc. Regardless, it is to be understood that the AVD 12 is configured to undertake present principles (e.g. communicate with other CE devices to undertake present principles, execute the logic described herein, and perform any other functions and/or operations described herein).

Accordingly, to undertake such principles the AVD 12 can be established by some or all of the components shown in FIG. 1. For example, the AVD 12 can include one or more displays 14 that may be implemented by a high definition or ultra-high definition "4K" or higher flat screen and that may be touch-enabled for receiving user input signals via touches on the display. The AVD 12 may include one or more speakers 16 for outputting audio in accordance with present principles, and at least one additional input device 18 such as e.g. an audio receiver/microphone for e.g. entering audible commands to the AVD 12 to control the AVD 12. The example AVD 12 may also include one or more network interfaces 20 for communication over at least one network 22 such as the Internet, an WAN, an LAN, etc. under control of one or more processors 24 including. A graphics processor 24A may also be included. Thus, the interface 20 may be, without limitation, a Wi-Fi transceiver, which is an example of a wireless computer network interface, such as but not limited to a mesh network transceiver. It is to be understood that the processor 24 controls the AVD 12 to undertake present principles, including the other elements of the AVD 12 described herein such as e.g. controlling the display 14 to present images thereon and receiving input therefrom. Furthermore, note the network interface 20 may be, e.g., a wired or wireless modem or router, or other appropriate interface such as, e.g., a wireless telephony transceiver, or Wi-Fi transceiver as mentioned above, etc.

In addition to the foregoing, the AVD 12 may also include one or more input ports 26 such as, e.g., a high definition multimedia interface (HDMI) port or a USB port to physically connect (e.g. using a wired connection) to another CE device and/or a headphone port to connect headphones to the AVD 12 for presentation of audio from the AVD 12 to a user through the headphones. For example, the input port 26 may be connected via wire or wirelessly to a cable or satellite source 26a of audio video content. Thus, the source 26a may be, e.g., a separate or integrated set top box, or a satellite receiver. Or, the source 26a may be a game console or disk player containing content that might be regarded by a user as a favorite for channel assignment purposes described further below. The source 26a when implemented as a game console may include some or all of the components described below in relation to the CE device 44.

The AVD 12 may further include one or more computer memories 28 such as disk-based or solid-state storage that are not transitory signals, in some cases embodied in the chassis of the AVD as standalone devices or as a personal video recording device (PVR) or video disk player either internal or external to the chassis of the AVD for playing back AV programs or as removable memory media. Also, in some embodiments, the AVD 12 can include a position or location receiver such as but not limited to a cellphone receiver, GPS receiver and/or altimeter 30 that is configured to e.g. receive geographic position information from at least one satellite or cellphone tower and provide the information to the processor 24 and/or determine an altitude at which the AVD 12 is disposed in conjunction with the processor 24. However, it is to be understood that another suitable position receiver other than a cellphone receiver, GPS receiver and/or altimeter may be used in accordance with present principles to e.g. determine the location of the AVD 12 in e.g. all three dimensions.

Continuing the description of the AVD 12, in some embodiments the AVD 12 may include one or more cameras 32 that may be, e.g., a thermal imaging camera, a digital camera such as a webcam, and/or a camera integrated into the AVD 12 and controllable by the processor 24 to gather pictures/images and/or video in accordance with present principles. Also included on the AVD 12 may be a Bluetooth transceiver 34 and other Near Field Communication (NFC) element 36 for communication with other devices using Bluetooth and/or NFC technology, respectively. An example NFC element can be a radio frequency identification (RFID) element.

Further still, the AVD 12 may include one or more auxiliary sensors 37 (e.g., a motion sensor such as an accelerometer, gyroscope, cyclometer, or a magnetic sensor, an infrared (IR) sensor, an optical sensor, a speed and/or cadence sensor, a gesture sensor (e.g. for sensing gesture command), etc.) providing input to the processor 24. The AVD 12 may include an over-the-air TV broadcast port 38 for receiving OTA TV broadcasts providing input to the processor 24. In addition to the foregoing, it is noted that the AVD 12 may also include an infrared (IR) transmitter and/or IR receiver and/or IR transceiver 42 such as an IR data association (IRDA) device. A battery (not shown) may be provided for powering the AVD 12.

Still referring to FIG. 1, in addition to the AVD 12, the system 10 may include one or more other CE device types. In one example, a first CE device 44 may be used to send computer game audio and video to the AVD 12 via commands sent directly to the AVD 12 and/or through the below-described server while a second CE device 46 may include similar components as the first CE device 44. In the example shown, the second CE device 46 may be configured as a VR headset worn by a player 47 as shown. In the example shown, only two CE devices 44, 46 are shown, it being understood that fewer or greater devices may be used.

In the example shown, to illustrate present principles all three devices 12, 44, 46 are assumed to be members of an entertainment network in, e.g., a home, or at least to be present in proximity to each other in a location such as a house. However, present principles are not limited to a particular location, illustrated by dashed lines 48, unless explicitly claimed otherwise.

The example non-limiting first CE device 44 may be established by any one of the above-mentioned devices, for example, a portable wireless laptop computer or notebook computer or game controller (also referred to as "console"), and accordingly may have one or more of the components described below. The first CE device 44 may be a remote control (RC) for, e.g., issuing AV play and pause commands to the AVD 12, or it may be a more sophisticated device such as a tablet computer, a game controller communicating via wired or wireless link with the AVD 12, a personal computer, a wireless telephone, etc.

Accordingly, the first CE device 44 may include one or more displays 50 that may be touch-enabled for receiving user input signals via touches on the display. The first CE device 44 may include one or more speakers 52 for outputting audio in accordance with present principles, and at least one additional input device 54 such as e.g. an audio receiver/microphone for e.g. entering audible commands to the first CE device 44 to control the device 44. The example first CE device 44 may also include one or more network interfaces 56 for communication over the network 22 under control of one or more CE device processors 58. A graphics processor 58A may also be included. Thus, the interface 56 may be, without limitation, a Wi-Fi transceiver, which is an example of a wireless computer network interface, including mesh network interfaces. It is to be understood that the processor 58 controls the first CE device 44 to undertake present principles, including the other elements of the first CE device 44 described herein such as e.g. controlling the display 50 to present images thereon and receiving input therefrom. Furthermore, note the network interface 56 may be, e.g., a wired or wireless modem or router, or other appropriate interface such as, e.g., a wireless telephony transceiver, or Wi-Fi transceiver as mentioned above, etc.

In addition to the foregoing, the first CE device 44 may also include one or more input ports 60 such as, e.g., a HDMI port or a USB port to physically connect (e.g. using a wired connection) to another CE device and/or a headphone port to connect headphones to the first CE device 44 for presentation of audio from the first CE device 44 to a user through the headphones. The first CE device 44 may further include one or more tangible computer readable storage medium 62 such as disk-based or solid-state storage. Also in some embodiments, the first CE device 44 can include a position or location receiver such as but not limited to a cellphone and/or GPS receiver and/or altimeter 64 that is configured to e.g. receive geographic position information from at least one satellite and/or cell tower, using triangulation, and provide the information to the CE device processor 58 and/or determine an altitude at which the first CE device 44 is disposed in conjunction with the CE device processor 58. However, it is to be understood that another suitable position receiver other than a cellphone and/or GPS receiver and/or altimeter may be used in accordance with present principles to e.g. determine the location of the first CE device 44 in e.g. all three dimensions.

Continuing the description of the first CE device 44, in some embodiments the first CE device 44 may include one or more cameras 66 that may be, e.g., a thermal imaging camera, a digital camera such as a webcam, and/or a camera integrated into the first CE device 44 and controllable by the CE device processor 58 to gather pictures/images and/or video in accordance with present principles. Also included on the first CE device 44 may be a Bluetooth transceiver 68 and other Near Field Communication (NFC) element 70 for communication with other devices using Bluetooth and/or NFC technology, respectively. An example NFC element can be a radio frequency identification (RFID) element.

Further still, the first CE device 44 may include one or more auxiliary sensors 72 (e.g., a motion sensor such as an accelerometer, gyroscope, cyclometer, or a magnetic sensor, an infrared (IR) sensor, an optical sensor, a speed and/or cadence sensor, a gesture sensor (e.g. for sensing gesture command), etc.) providing input to the CE device processor 58. The first CE device 44 may include still other sensors such as e.g. one or more climate sensors 74 (e.g. barometers, humidity sensors, wind sensors, light sensors, temperature sensors, etc.) and/or one or more biometric sensors 76 providing input to the CE device processor 58. In addition to the foregoing, it is noted that in some embodiments the first CE device 44 may also include an infrared (IR) transmitter and/or IR receiver and/or IR transceiver 78 such as an IR data association (IRDA) device. A battery (not shown) may be provided for powering the first CE device 44. The CE device 44 may communicate with the AVD 12 through any of the above-described communication modes and related components.

The second CE device 46 may include some or all of the components shown for the CE device 44. Either one or both CE devices may be powered by one or more batteries.

Now in reference to the afore-mentioned at least one server 80, it includes at least one server processor 82, at least one tangible computer readable storage medium 84 such as disk-based or solid-state storage, and at least one network interface 86 that, under control of the server processor 82, allows for communication with the other devices of FIG. 1 over the network 22, and indeed may facilitate communication between servers and client devices in accordance with present principles. Note that the network interface 86 may be, e.g., a wired or wireless modem or router, Wi-Fi transceiver, or other appropriate interface such as, e.g., a wireless telephony transceiver.

Accordingly, in some embodiments the server 80 may be an Internet or an entire server "farm" and may include and perform "cloud" functions such that the devices of the system 10 may access a "cloud" environment via the server 80 in example embodiments for, e.g., network gaming applications. Or, the server 80 may be implemented by one or more game consoles or other computers in the same room as the other devices shown in FIG. 1 or nearby.

The methods herein may be implemented as software instructions executed by a processor, suitably configured application specific integrated circuits (ASIC) or field programmable gate array (FPGA) modules, or any other convenient manner as would be appreciated by those skilled in those art. Where employed, the software instructions may be embodied in a non-transitory device such as a CD ROM or Flash drive. The software code instructions may alternatively be embodied in a transitory arrangement such as a radio or optical signal, or via a download over the Internet.

Figure 2:
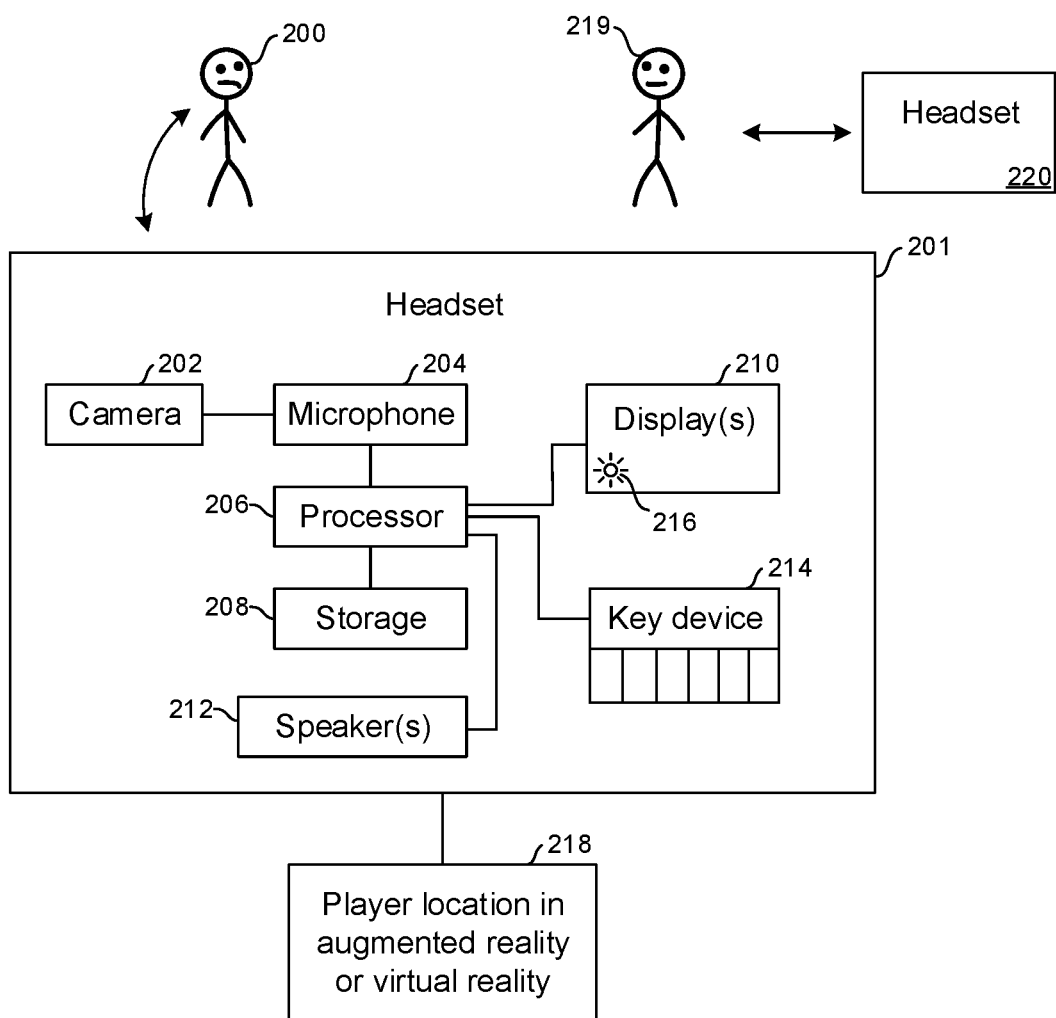
FIG. 2 is a block diagram of an example specific system.

FIG. 2 shows a specific example system that may be implemented by any of the devices and components described above. A first player 200 of an AR or VR computer game may use a gaming implement such as a headset 201 such as is embodied by the CE device 46 of FIG. 1 and/or as further shown in a specific non-limiting example in FIG. 2. The headset 201 may include one or more cameras 202 that can image the eyes of the player 200 as well as one or more microphones 204 that can detect sound such as speech from the player 200. The camera 202 and microphone 204 may communicate with one or more processors 206 accessing one or more computer storages 208 consistent with principles herein to output visible information on one or more displays 210 and/or speakers 212. The processor 206 may receive input from a key entry device 214 such as but not limited to a computer game controller, keyboard, keypad, etc. An indicator 216 such as a lamp or icon on a display may be provided for purposes to be shortly disclosed.

The processor 206 may communicate, via a wired or wireless transceiver such as any of those shown in FIG. 1 and described above, with a source 218 of player locations to receive information regarding the virtual locations of other players in a VR scenario or the actual physical locations of other players in an AR scenario. The source 218 may be implemented by, e.g., a computer game console. Note that the player locations may include specific eye locations that can be determined, in the AR scenario, using a position sensor such as a GPS sensor closely juxtaposed with the eyes, e.g., as may be mounted on a headset. In VR scenarios the locations of the players' eyes typically are modeled by the game and displayed on the headsets or other displays of other players.

A second player 219 in the game being played by the first player 200 may wear a headset 220 or other gaming implement that in all substantial respects may be identical to the gaming implement 201 of the first player 200. Additional players may be similarly provided for. The second headset 220 likewise receives player location information from the source 218.

Figure 3:
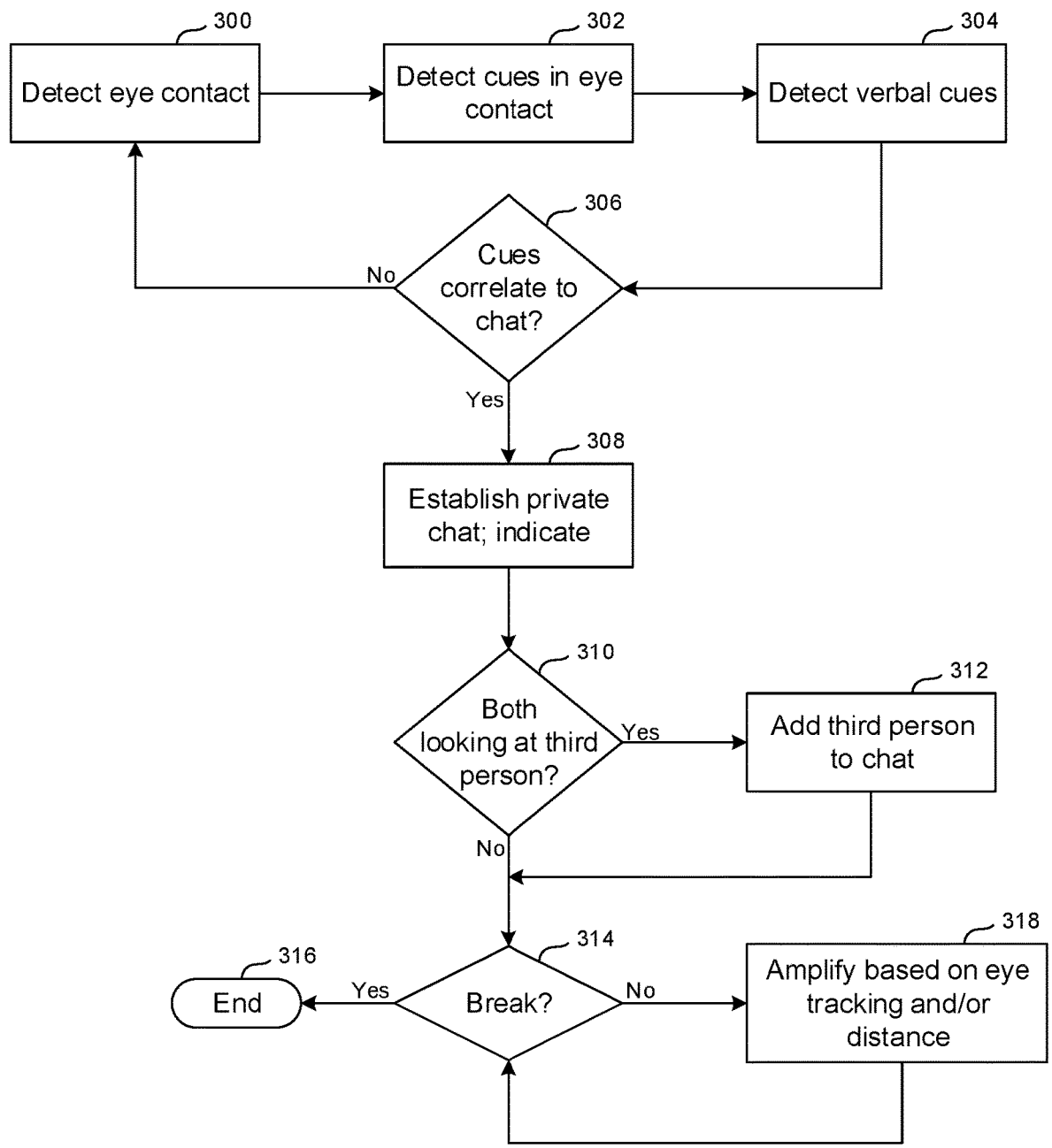
FIG. 3 is a flow chart of example logic consistent with present principles.

With the above in mind, attention now turns to FIG. 3. Commencing at block 300, mutual eye contact between the first and second players 200, 219 is detected by one or more of the processors shown and described herein. This may be done using eye tracking of each player based on images from the cameras in the headsets, which are processed using image recognition to, e.g., determine, from the relative locations/orientations of the pupils of the eyes, the directions in which the players are looking. In AR scenarios the direction of gaze of the first player 200 is compared to the actual physical location of the second player 219 including the eyes of the second player 219 as may be received, e.g., from the source 218 in FIG. 2, to determine whether the gaze of the first player is directed at the second player 219 and in some examples is directed at the eyes of the player 219 when eye location specifically is known. In other implementations of less granularity, a general player location can be used as a proxy for eye location. In VR scenarios, the actual direction of gaze of the first player 200 is transformed to the VR world to determine which object the first player is looking at. If the object is located at the position of the emulated eyes of the second player 219, then the first player is determined to be looking at the eyes of the second player regardless of the real-world head and eye orientations of the first and second players.

The gaze of the second player 219 is similarly determined to identify whether the second player is looking at the first player 200. When it is determined that the players 200, 219 are mutually looking into each other's eyes, mutual eye contact at block 300 is identified.

If desired, the logic may move from block 300 to block 302 to detect visual cues in the eye contact between the players. These clues may include, e.g., the length of time mutual eye contact is held, eye signals such as winking or blinking, etc. Moreover, if desired the logic may move to block 304 to determine whether verbal cues related to ensuing logic are received as may be detected by, e.g., the microphones described in reference to FIG. 2.

In any case, once mutual eye contact between the players 200, 219 is detected at block 300 and accommodating any visual and/or verbal clues as may be implemented, the logic moves to decision diamond 306 to determine whether the mutual eye contact in light of visual and/or verbal clues correlates to the opening of a communication channel between the players 200, 219, such as a private chat channel. In some embodiments mutual eye contact is all that is needed to open the communication channel. In other embodiments the communication channel is established only if mutual eye contact is held for a threshold time period (as an example of a visual cue). In some embodiments the communication channel is established only so long as mutual eye contact is held (as another example of a visual cue). In some embodiments the communication channel is established only if a confirmation word is received at block 304, as an example of a verbal cue. Also, in some embodiments, mutual eye contact of the players and a mutual gesture such as a mutual head nod may be used to open the communication channel (as another example of a visual cue). Additionally, aside from visual and verbal cues, a friends list may also be used so that, for example, mutual eye contact of the players and also the players being on each other's respective social media or gaming friends list may be used as a trigger to open the communication channel.

Responsive to determining that the results of block 300 and, when provided, the results of blocks 302 and/or 304 correlate to establishing a communication channel, a communication channel such as a private chat channel is established at block 308. The indicator 216 shown in FIG. 2 may be activated to indicate that the communication channel is open, and an audio cue may also be presented to the players to indicate that the communication channel is open (e.g., a "walkie talkie" static sound). The communication channel may be a voice-implemented private channel that conveys words spoken by one player into his or her microphone to the speakers of the headset of the other player, potentially with presenting transcribed text of the voice on a display and without conveying the spoken words to other players that are not included in the channel. In addition, or alternatively, the communication channel may be a key entry channel in which a player may, for instance, manipulate the key entry device of his or her game implement to input text messages, which are presented on the display of the other player. These are but two examples of how to implement a communication channel consistent with present principles.

Decision diamond 310 indicates that if desired, a third person may be admitted to the communication channel at block 312 responsive to a determination that at least one and in some embodiments both the first and second players 200, 219 are looking toward the third person. If desired, additional conditions may be implemented to grant access to the third person to the communication channel. For example, both players 200, 219 looking at the third player plus audio confirmation and/or the third player being on a friend list may be required to grant the third player access to the channel.

Decision diamond 314 indicates that it may be identified whether the communication channel should be terminated, and if so the process ends at state 316. As an example, to terminate the channel various patterns of eye blinking may be used (e.g., two blinks within a threshold time), or a simple look away from the other player may be used, as well as verbal commands or key entry commands such as a verbal "hold on" command or selection of a predefined key, respectively. Selection of a selector that is part of a graphical user interface (GUI) presented on the headset display or the display of another device may also be used to terminate the communication channel. Additionally, in embodiments where the communication channel is established if mutual eye contact is held for the threshold time period referenced above and then the players can look elsewhere while the communication channel is still maintained, mutual eye contact being established again subsequent to the players looking elsewhere may be used to terminate the communication channel. Additionally, or alternatively, a mutual head nod while the channel is open may be used to terminate the channel.

In some implementations the audio volume of speech from one player to another over the channel may be amplified at block 318 based on eye tracking/mutual eye contact, and/or based on distance between the players with more amplification being used for less distance, or vice-versa. Additionally, virtual ears of one of the players as represented to the other player may appear progressively bigger to the other player the closer the distance between the players (in real or virtual space) while the channel is maintained. Note that particularly for AR scenarios the depicted lips of a player would not be rendered with voice chat to correspond to the voice chat.

If a player leaves the room, the communication channel may be terminated, or in other examples it may be maintained. When key entry is used, a press and hold of shift can be used or the toggling of a capitals key can be used to indicate that the channel should remain established.

The above logic may be executed by any one or more of the processors described herein in cooperation with one or more other processors in communication there with.

Figure 4:
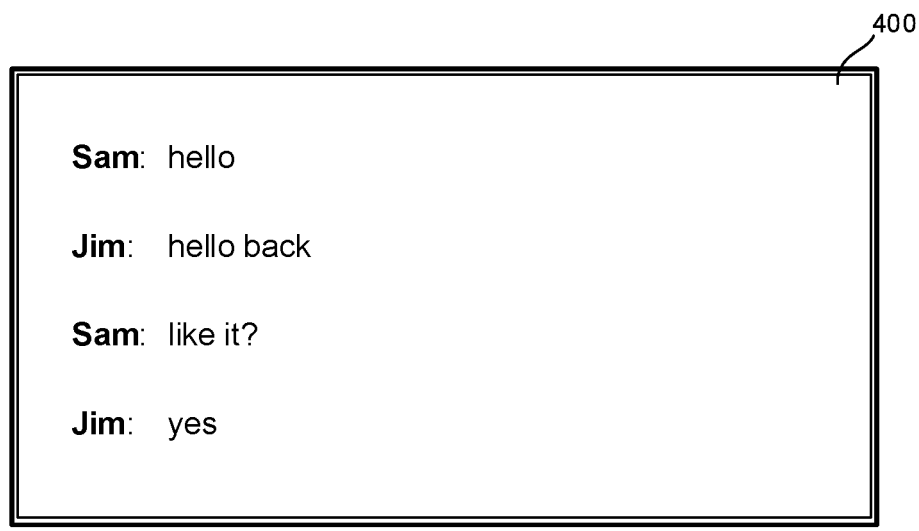
FIG. 4 is a screen shot of an example chat window.

FIG. 4 illustrates an example user interface 400 that may be presented on speakers and/or displays of the players 200, 219, such as headset speakers/displays. The UI 400 illustrates a chat between two players named Sam and Jim.

Figure 5:
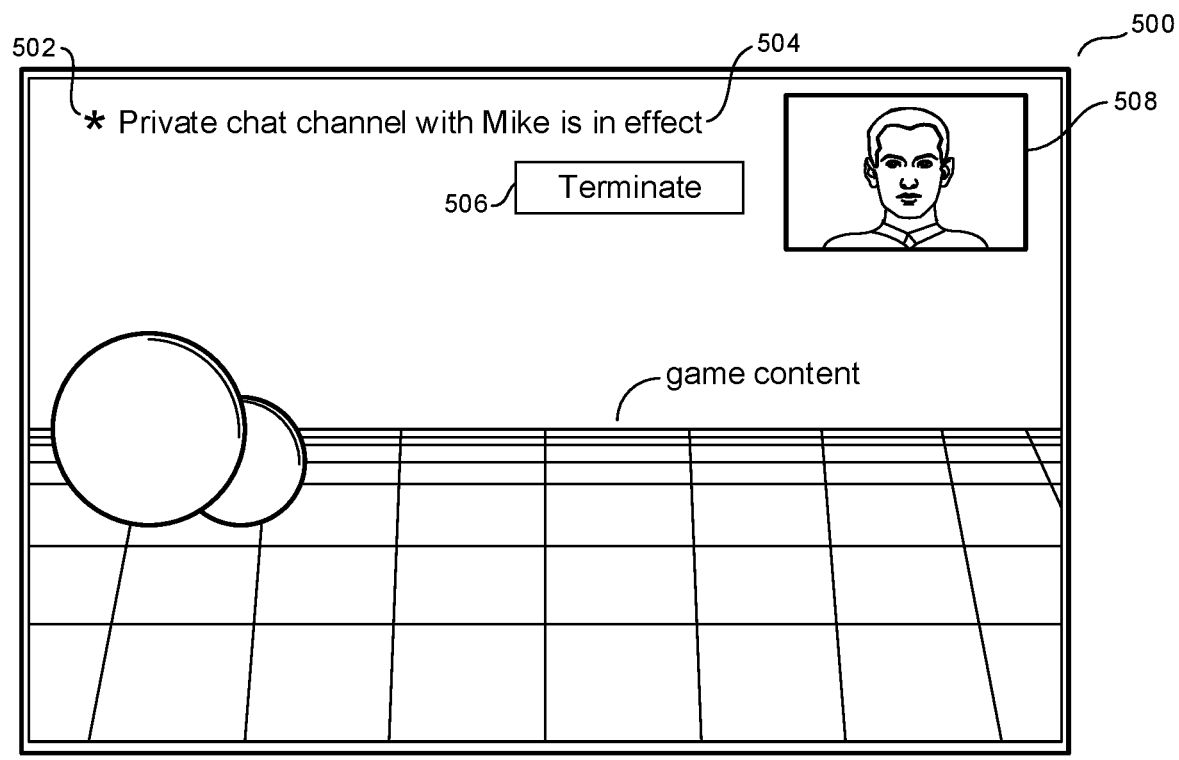
FIG. 5 is an illustration of an example user interface consistent with present principles.

FIG. 5 illustrates an example graphical user interface (GUI) 500 that may be presented on a headset display as part of an AR or VR setting in accordance with present principles. The AR or VR setting may be established by a video game as shown, though other settings such as AR interactions in a social setting are also envisioned. In any case, the GUI 500 may include an asterisk icon 502 as well as text 504 that indicates that a private communication channel with another player has been established and/or is being maintained. In some embodiments, one or both of the icon 502 and text 504 may be presented on the headset display in a green color to indicate the private communication channel.

A terminate selector 506 may also be presented as part of the GUI 500 and may be selectable to terminate the private communication channel. The terminate selector 506 may be selected by the wearer of the headset by looking at the selector 506 for a threshold non-zero amount of time, as detected by the headset using eye tracking. Touch input or a verbal command may also be used to select the selector 506.

Still further, a window 508 showing a video feed of another player's real or virtual face may be presented. In some embodiments, the window 508 may only be presented when the private communication channel is established and while it is maintained to indicate the private communication channel, and otherwise it may not be presented. In other embodiments, the private communication channel may be established based on each player looking at their respective window 508 showing the video feed of the other respective player and the channel may be terminated responsive to at least one of the players looking away from the respective window 508 as presented at his/her respective headset. In still other embodiments, the private communication channel itself may be established based on mutual eye contact alone and/or the other methods as described herein, but audio spoken by the wearer of the headset may only be sent from the headset to the other player as part of the private communication channel when the wearer of the headset looks at the window 508, as detected by the headset using eye tracking.

While particular techniques and machines are herein shown and described in detail, it is to be understood that the subject matter which is encompassed by the present invention is limited only by the claims.

What is claimed is:

1. A storage device comprising:
at least one computer medium that is not a transitory signal and that comprises instructions executable by at least one processor to:
identify that a first user in a virtual reality (VR) or augmented reality (AR) setting has made eye contact with a second user in the VR or AR setting;
responsive to identifying that the first and second users have made eye contact, establish a communication channel between the first and second users; and
allow a third user to access the communication channel between the first and second users responsive to identifying that both the first and second users are looking at the third user and not allow the third user access to the communication channel between the first and second users responsive to only one of the first user or the second user looking at the third user.

2. The storage device of claim 1, wherein the communication channel comprises a private chat channel.

3. The storage device of claim 1, wherein the instructions are executable to maintain the communication channel only as long as the first and second users are identified as having eye contact with each other.

4. The storage device of claim 1, wherein the instructions are executable to establish the communication channel responsive to a determination that the first and second users are identified as having eye contact with each other for at least a non-zero time period.

5. The storage device of claim 1, wherein the instructions are executable to terminate the communication channel responsive to a verbal cue comprising a verbal command.

6. The storage device of claim 1, wherein the instructions are executable to terminate the communication channel responsive to a signal imparted by one or more eyes of at least one of the users, the signal comprising blinking.

7. The storage device of claim 1, wherein the instructions are executable to establish the communication channel responsive to both identifying that the first and second users have made eye contact, and a confirmation word is received.

8. The storage device of claim 1, wherein the setting is an AR setting, and identifying that the first user has made eye contact with the second user comprises determining that the first user has looked toward a physical location of the second user.

9. The storage device of claim 1, wherein the setting is a VR setting, and identifying that the first user has made eye contact with the second user comprises determining that the first user has looked toward a virtual location of the second user in VR space.

10. A method, comprising:
using player-to-player eye contact to identify whether a first player in an augmented reality (AR) or virtual reality (VR) game has established eye contact with a second player; and
responsive to identifying that eye contact has been established between the first and second players, establish a communication channel between the first and second players, wherein the game is a VR game, and identifying that the first player has made eye contact with the second player comprises determining that the first player has looked toward a virtual location of the second player in VR space of the VR game, wherein responsive to the communication channel being established, the method includes enlarging virtual ears of the first player as presented on at least one display.

11. The method of claim 10, wherein the communication channel comprises a private chat channel.

12. The method of claim 10, comprising maintaining the communication channel only as long as the first and second players are identified as having eye contact with each other.

13. The method of claim 10, comprising establishing the communication channel responsive to a determination that the first and second players are identified as having eye contact with each other for at least a non-zero time period.

14. The method of claim 10, comprising allowing a third player to access the communication channel responsive to identifying that the first and second players are both looking at the third player.

15. The method of claim 10, wherein the game is an AR game, and identifying that the first player has made eye contact with the second player comprises determining that the first player has looked toward a physical location of the second player.

16. A system, comprising:
at least a first augmented reality (AR) or virtual reality (VR) headset wearable by a first user;
at least a second AR or VR headset wearable by a second user;
respective cameras configured to produce image signals of the eyes of the first and second users; and
at least one processor configured with instructions for:
identifying that the first user has made eye contact with the second user;
responsive to identifying that the first and second users have made eye contact, establishing a communication channel between the first and second users; and
allowing a third user to access the communication channel between the first and second users responsive to identifying that both the first and second users are looking at the third user and not allow the third user access to the communication channel between the first and second users responsive to only one of the first user or the second user looking at the third user.

17. The system of claim 16, wherein the instructions are executable for:
maintaining the communication channel only as long as the first and second users are identified as having eye contact with each other.

18. The system of claim 16, wherein the instructions are executable for establishing the communication channel responsive to a determination that the first and second users are identified as having eye contact with each other for at least a non-zero time period.

19. The system of claim 16, wherein the instructions are executable for terminating the communication channel responsive to a signal imparted by one or more eyes of at least one of the users, the signal comprising blinking.

* * * * *